United States Patent [19]

Harrington et al.

[11] E Re. 29,277

[45] Reissued June 28, 1977

[54] COMBINATION LOCK

[76] Inventors: Richard P. Harrington; Russell J. Harrington, both of P.O. Box 474, Mountainburg, Ark. 72946

[22] Filed: Apr. 23, 1975

[21] Appl. No.: 570,557

Related U.S. Patent Documents

Reissue of:

[64] Patent No.: 3,729,962
Issued: May 1, 1973
Appl. No.: 168,113
Filed: Aug. 2, 1971

[52] U.S. Cl. ..... 70/25; 70/311
[51] Int. Cl.² ..... E05B 37/04
[58] Field of Search ..... 70/25, 26, 27, 28, 29, 70/51, 52, 311, 315, 316, 328, DIG. 44

[56] References Cited

UNITED STATES PATENTS

| | | | |
|---|---|---|---|
| 1,551,952 | 9/1925 | Hanflig | 70/26 |
| 2,245,741 | 6/1941 | Winning | 70/25 |
| 2,925,726 | 2/1960 | Miller | 70/333 R |
| 2,966,788 | 1/1961 | Amo | 70/311 X |
| 3,170,316 | 2/1965 | Miller | 70/311 X |
| 3,196,643 | 7/1965 | Moss | 70/311 X |
| 3,410,121 | 11/1968 | Morin | 70/25 |

*Primary Examiner*—Robert L. Wolfe
*Attorney, Agent, or Firm*—Jennings B. Thompson

[57] ABSTRACT

A combination lock of the exposed shackle type is disclosed. The shackle is held in its locked position by locking means that are released when a fence member is moved into gates located in the periphery of two tumbler wheels. The tumbler wheels are positioned for the gates to receive the fence by a dial and keyed shaft, after which the key is moved axially of the shaft out of driving connection with the tumbler wheels and into driving connection with the fence means. Rotation of the dial moves the fence means to release the shackle. The tumbler wheels have a rim and hub that are connected through a friction clutch type connection to allow the rim to be held while the hub is rotated. This allows the combination of the lock to be changed, when the lock is open, by actuating a lever mounted externally on the side of the lock housing that holds the fence means in engagement with the gates in the periphery of the tumbler wheels while the hubs are rotated by the dial. If the combination is forgotten, apparatus is provided to locate the rims in a predetermined position from which position a master combination can be used to open the lock.

23 Claims, 16 Drawing Figures

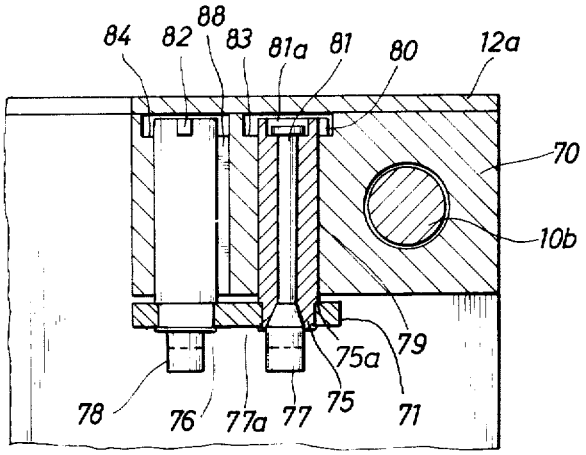
FIG. 7
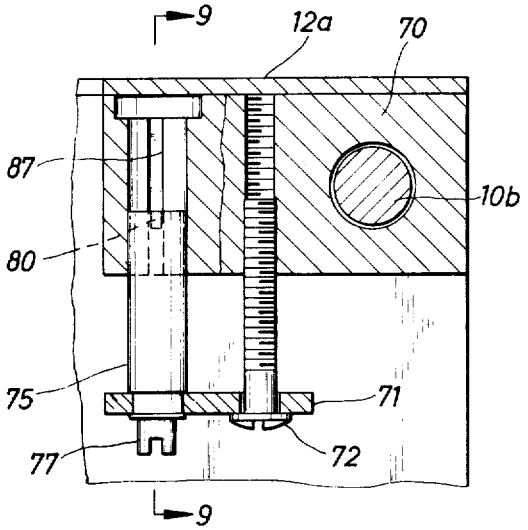
FIG. 8
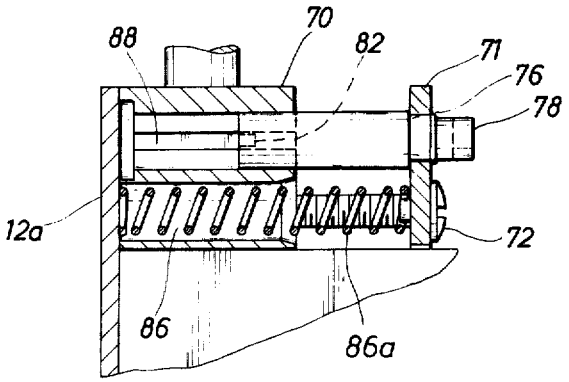
FIG. 9
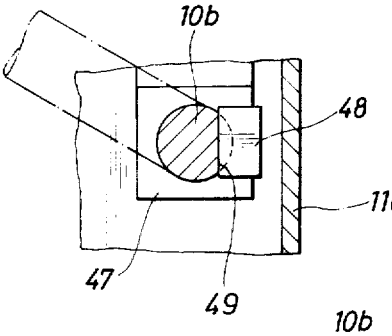
FIG. 11
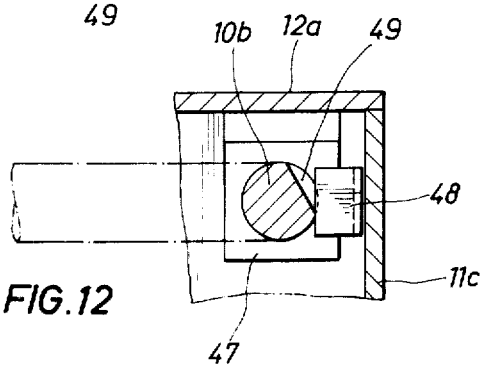
FIG. 12
FIG. 10
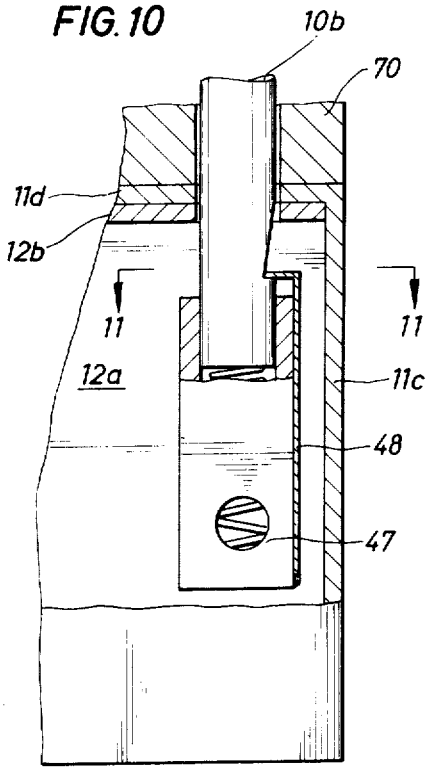

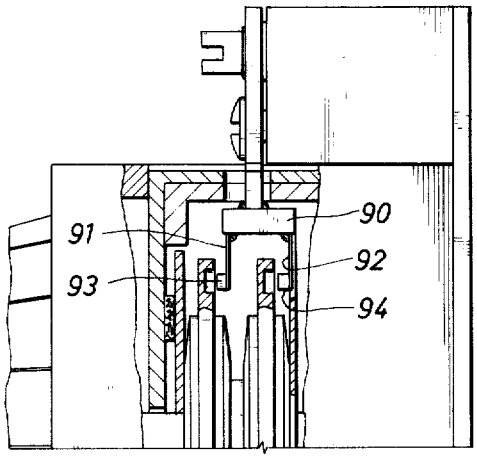
FIG. 13
FIG. 15
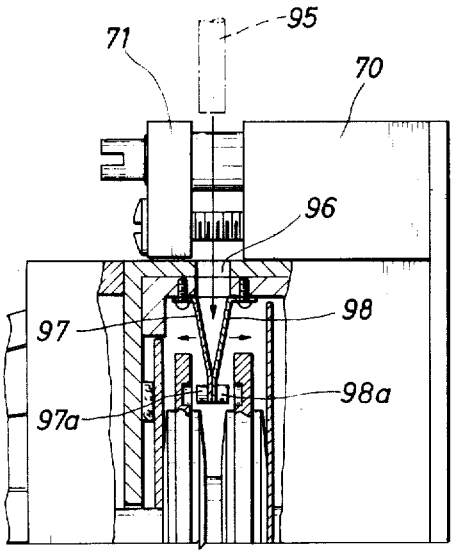
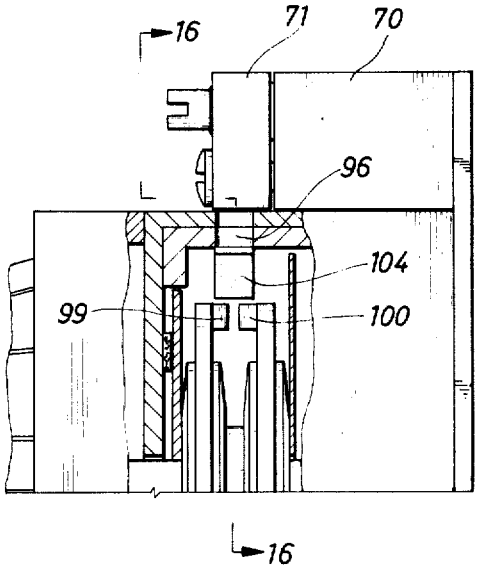
FIG. 14
FIG. 16
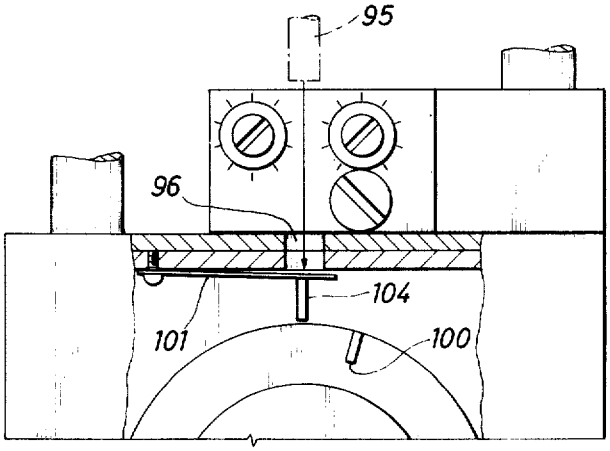

COMBINATION LOCK

Matter enclosed in heavy brackets [ ] appears in the original patent but forms no part of this reissue specification; matter printed in italics indicates the additions made by reissue.

*This is an application for reissue of U.S. Pat. No. 3,729,962, issued May 1, 1973, and entitled "Combination Lock."*

This invention relates to combination locks, generally and in particular to combination locks that employ a plurality of tumbler wheels that are set by a dial to allow a fence to enter gates in the tumblers and open a lock.

As stated above, combination locks of the type to which this invention relates depend for their operation upon the alignment of a plurality of rotatable discs, commonly called tumblers or tumbler wheels, each of which is provided with a gating notch or recess in the periphery. When the tumbler wheels are so positioned that the gating recesses are in position to receive a projecting element, usually called a fence, the lock is ready to be opened, which operation will take place when the fence is moved into engagement with the gates.

Three main design problems present themselves with locks of this type. First, the lock should be arranged so that the combination cannot be detected by a picklock. Secondly, provision should be made to allow the combination of the lock to be changed from time to time by the owner thereof. And thirdly, provision should be made to allow the lock to be opened should the combination be forgotten. This is a particularly important feature in connection with locks that allow the combination to be changed readily, since it sometimes happens that when changing the combination periodically, the owner thereof will forget to what combination it was last set.

With regard to the first criteria, in order to keep a picklock from being able to detect the combination, the fence must be held out of contact with the tumbler wheels at any time that the tumbler wheels can be rotated.

Therefore, it is an object of this invention to provide a combination lock of the type described above, wherein the fence is held out of engagement with the tumbler wheels until the lock is to be opened, at which time the driving connection between the tumbler wheels and the dial of the lock is disengaged so that the tumbler wheels cannot be rotated while the fence is moved into contact with the gates.

It is a further object of this invention to provide a combination lock of the type described above that allows the combination of the lock to be quickly and easily changed by the owner thereof, without having to insert a key or the like inside the lock, or remove the case to expose the innerworkings of the lock.

It is another object of this invention to provide a lock of the type described that allows the combination of the lock to be changed, when the lock is open, by actuating a lever mounted externally of the housing.

It is another object of this invention to provide a combination lock with tumbler wheels having a rim and a hub with only a frictional driving connection therebetween to allow the hub to be rotated relative to the rim simply by holding the rim against rotation.

It is a further object of this invention to provide a combination lock of the type described above wherein the lock can be opened by using a master combination known to the owner thereof, should he ever forget the combination to which he last set the lock.

It is another and further object of this invention to provide a combination lock of the type described above wherein the screws holding the lock housing together are positioned so that when the lock is closed, the shackle will bar access to the screws to prevent the housing of the lock from being disassembled until the lock has been opened.

These and other objects, advantages, and features of this invention will be apparent to those skilled in the art from a consideration of this specification, including the attached drawings and appended claims.

The invention will now be described in detail in connection with the attached drawings in which, FIG. 1 is an isometric view of the preferred embodiment of the lock of this invention;

FIG. 7 is a sectional view taken along line 7—7 of FIG. 5, of a portion of the apparatus for opening the lock when the combination has been forgotten;

FIG. 8 is a view similar to FIG. 7, but showing the lost combination apparatus in another position;

FIG. 9 is a sectional view taken along line 9—9 of FIG. 8;

FIG. 10 is a partial sectional view of one leg of the shackle of the lock when the lock is opened;

FIG. 11 is a view taken along line 11—11 of FIG. 10;

FIG. 12 is a view similar to FIG. 11, but showing the position of the shackle when the lock is closed;

FIG. 13 is a view partially in elevation and partially in section of an alternate embodiment of the apparatus employed to open the lock when the combination is lost;

FIG. 14 is a view partially in elevation and partially in section of another alternate embodiment of the lost combination apparatus, with the apparatus shown in position to be actuated;

FIG. 15 is a view partially in elevation and partially in section of yet another alternate embodiment of the lost combination apparatus; and FIG. 16 is a view taken along line 16—16 of FIG. 15.

Figure 1:
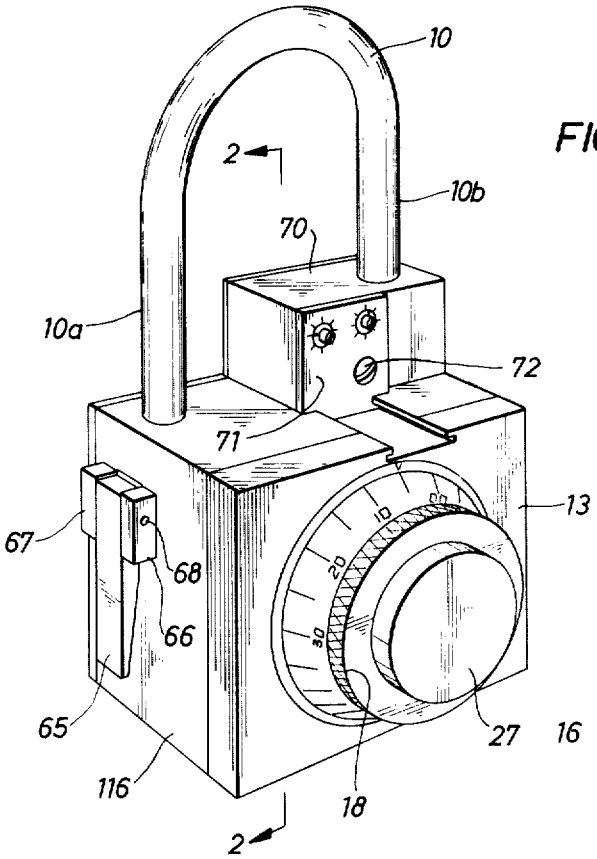

The combination lock of this invention can be used on any type lock, including door locks where the shackle is commonly called a "bolt." The lock shown in the drawings is of the exposed shackle padlock type. Shackle 10 is U-shaped, having legs 10a and 10b that extend into and are locked in the housing of the lock when the lock is closed or in the locked position. Means to be described below will hold the legs in the housing of the lock until the proper combination has been dialed and other manipulations have been performed with the lock.

Figure 2:
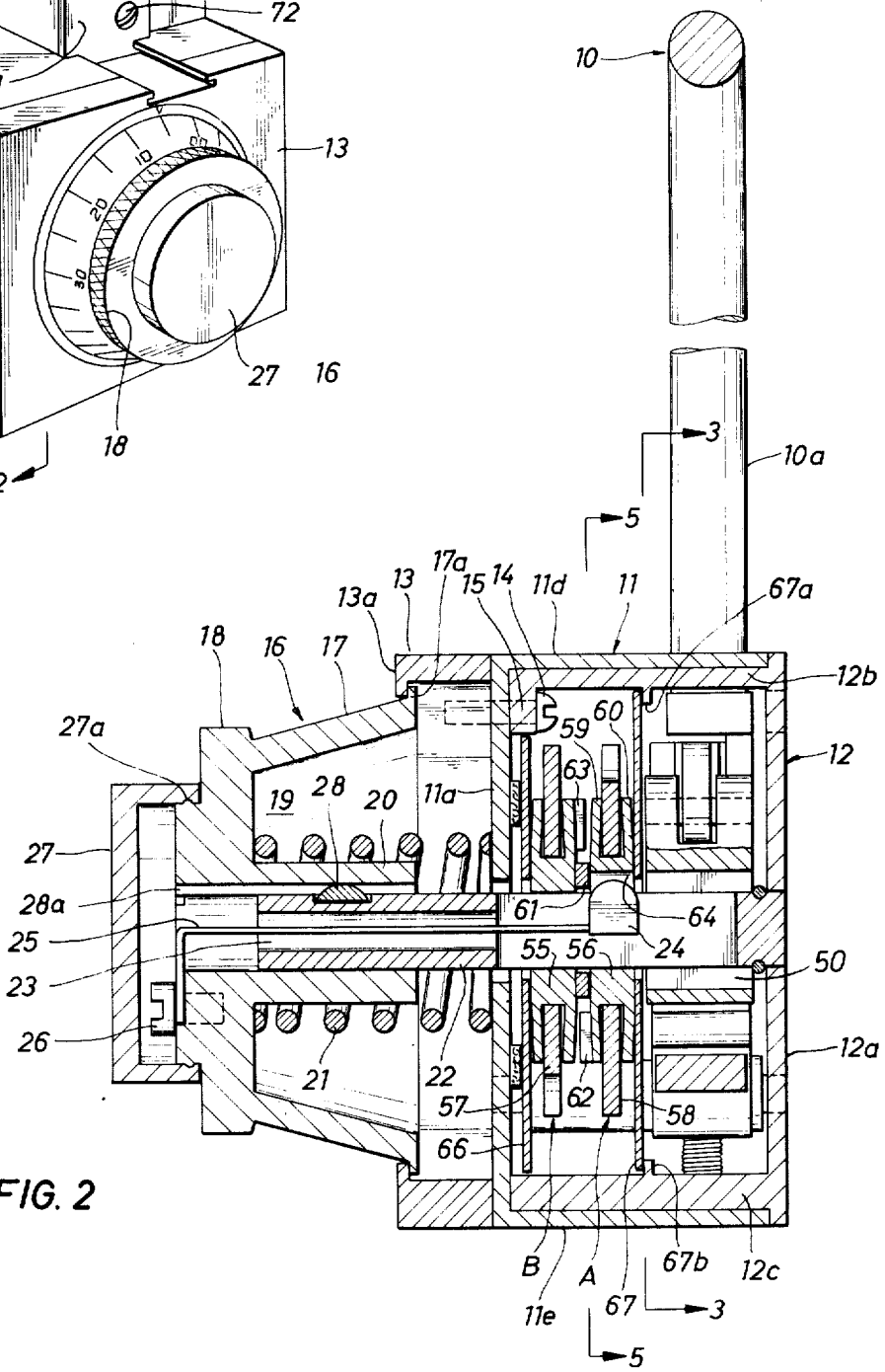
FIG. 2 is a vertical sectional view taken along line 2—2 of FIG. 1.
Figure 3:
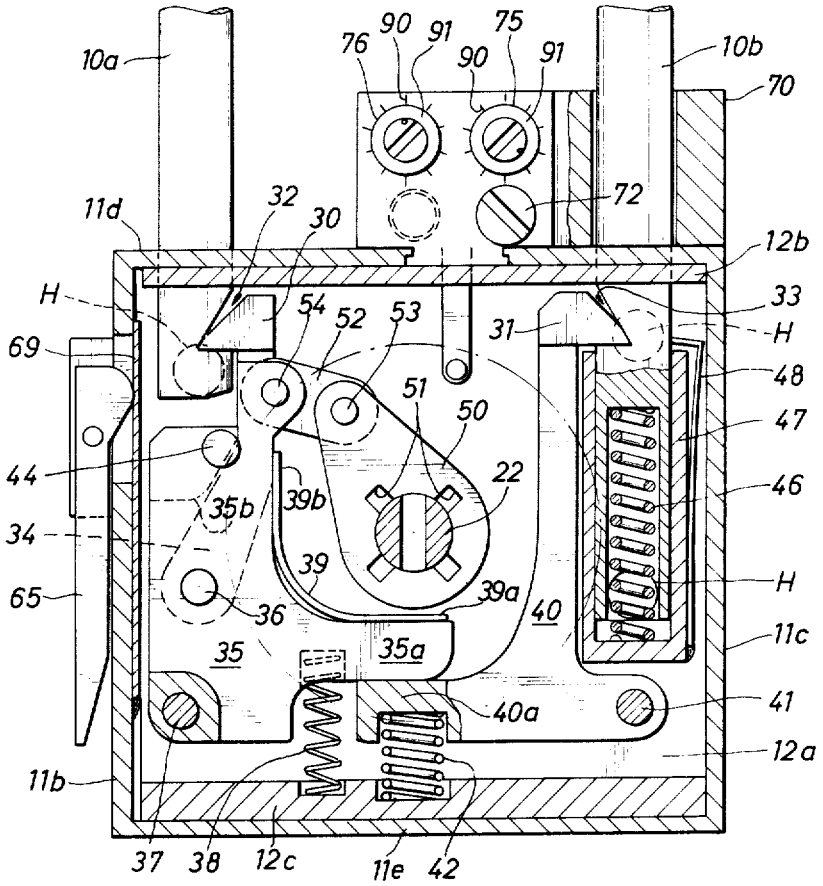
FIG. 3 is a sectional view taken along line 3—3 of FIG. 2.

The housing of the lock in the embodiment shown, includes member 11 that is shaped like a square cup. It has front wall 11a, as best seen in FIG. 2, and sidewalls 11b and 11c, top wall 11d, and bottom wall 11e, as best seen in FIG. 3. The side opposite front wall 11a is open. Closing the opening in the back of member 11, and forming the back wall of the housing for the lock, is housing member 12. It has back wall 12a, and mounting plate members 12b and 12c that are integrally attached to back wall 12a and positioned to slide into cup-shaped housing member 11 just under the top and bottom wall thereof. The third member of the housing comprises dial mounting plate 13. When assembled, these housing members are connected together by machine screws 14 that extend through mounting lugs 15 on mounting plate members 12b and 12c, front wall 11a of member 11, and into tapped holes in dial mounting plate 13. The arrangement of one of the lug and housing screws, and which is typical, is seen in FIG. 2.

Dial 16 of the lock includes truncated conical section 17 and knurled hub 18. The conical section is inscribed with the usual lines and numbers. An indexing mark is inscribed in the dial mounting plate. The knob has annular cavity 19, formed by conical section 17, and integrally connected sleeve 20. When mounted in the lock, as shown in FIG. 2, the hub is located in hub supporting plate 13 by moving it through the opening provided therefor in the plate from right to left, as viewed in FIG. 2, until flange 17a on conical section 17 engages inwardly extending flange 13a on the opening in the dial supporting plate. Coil spring 21, located in annular cavity 19 and engaging front plate 11a of housing member 11, urges the dial outwardly and resiliently holds flanges 17a and 13a in engagement. The spring, however, allows the dial to be moved inwardly toward front plate 11a of the housing by compressing the spring.

Extending into sleeve 20, along its central longitudinal axis, is one end of drive shaft 22. The other end of the drive shaft extends into a central hole in back plate 12a to be supported at that end by the plate. The shaft is keyed to sleeve 20 for rotation with the dial by key 28 located in keyway 28a. The keyway is long enough to allow the dial to reciprocate on the shaft to the extent allowed by the dial mounting plate and spring 21. The shaft has a central opening 23 that extends from its left hand end, as viewed in FIG. 2, to a portion that is slotted to receive key 24. Spring rod 25 has one end attached to key 24, and the other end bent 90° and attached to the front of dial 16 by screw 26. The spring wire is so shaped that it will resiliently urge key 24 upwardly out of the slot in the shaft to engage keyways in the members to be driven. This allows the key to move into the slot in the shaft to pass by members mounted on the shaft that do not have keyways, when the key is moved longitudinally of the shaft by the dial, or whenever the key is out of alignment with a keyway, it will move inwardly until the keyway is moved into position for the key to engage it.

The end of dial 16 is covered by cap 27. Preferably, the cap is removably mounted on the knob, and in the embodiment shown it is cup-shaped and provided with an internal groove 27a positioned to receive an annular ridge formed on the front hub of the dial. The cap is made of a material having sufficient resiliency to allow the cap to be snapped into position with the ridge engaging the internal groove.

Figure 4:
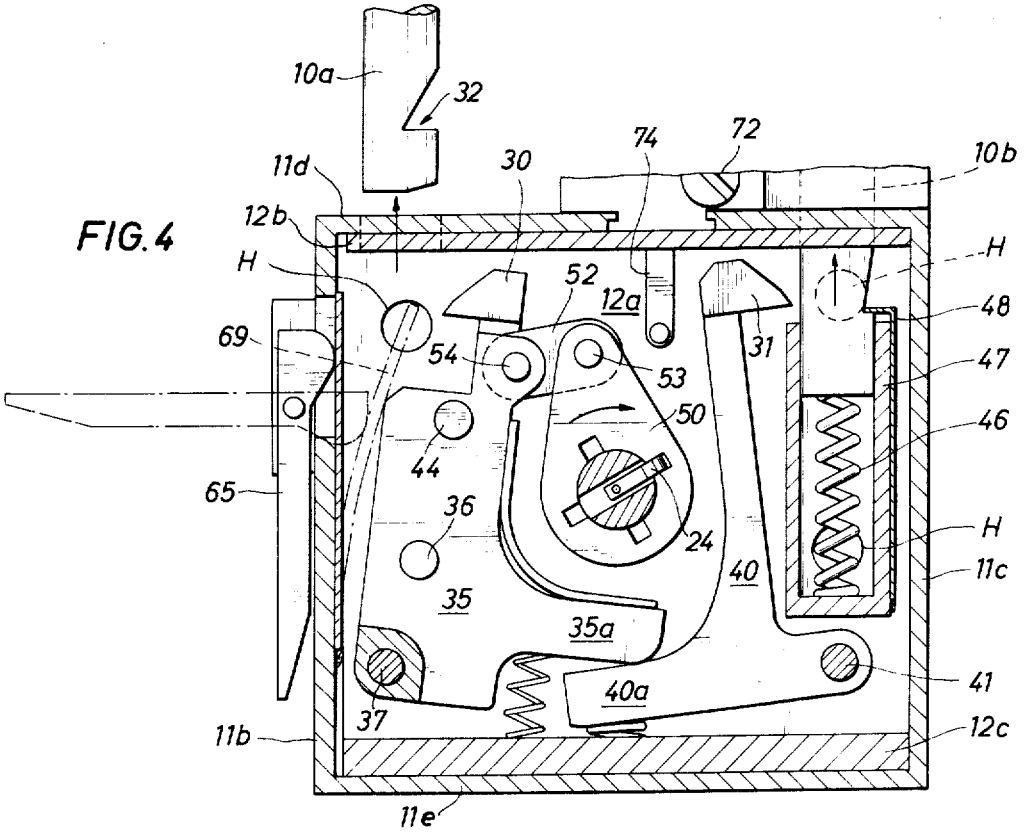
FIG. 4 is a view similar to FIG. 3, with the fence means moved into engagement with the gates and the locking means moved out of locking engagement with the shackle, and also showing the combination changing lever actuated to allow the combination of the lock to be changed.

In the combination lock shown in the drawings, shackle 10 moves between a locked position, as shown in FIG. 3, and an unlocked position, shown in FIG. 4, where leg 10a of the shackle is above and clear of the housing of the lock. In accordance with this invention, locking means are provided that are movable into locking engagement with the shackle to hold the shackle in locked position and out of engagement with the shackle to unlock the lock. As best seen in FIGS. 3 and 4, in the embodiment shown, the locking means includes locking dogs 30 and 31 that engage the flat side of V-shaped notches 32 and 33 located in shackle legs 10a and 10b, respectively. Dog 30 is connected to arm 34. The lower end of this arm is pivotally connected to generally L-shaped member 35 by pin 36. Member 35 in turn, is pivotally mounted on back wall 12a of the housing by pin 37. Coil spring 38 is located between bottom plate 12c and arm 35a of member 35, to urge the member to rotate around pin 37 in a counterclockwise direction as viewed in FIG. 3. Member 35 is provided with an outwardly extending shoulder 35b (shown dotted in the drawings), that engages member 34 to carry member 34 with member 35 as it is moved in a clockwise direction around pin 37, but to allow member 34 to move in that same direction around pin 36 independently of member 35, when such movement is imposed on member 34 independently of the member 35. Spring 39 has end 39a attached to arm 35a of member 35. Other end 39b is positioned to engage member 34 and resiliently urge this member to the position shown in FIG. 3 against shoulder 35b, but to allow member 34 and dog 30 to move clockwise as required to permit shackle leg 10a to move past the dog when the shackle is being returned to its locked position. Thus, the dog 30 can be cammed to the right by the shackle, independently of member 35.

Dog 31 that holds leg 10b of the shackle is integrally attached to L-shaped member 40, which is pivotally mounted on back wall 12a by pin 41. Coil spring 42, positioned between arm 40a of the member and leg 12c, resiliently urges member 40 in a clockwise direction around pin 41 to hold the member in the position shown in FIG. 3, with dog 31 holding shackle leg 10b from moving to the unlocked position of FIG. 4.

Figure 5:
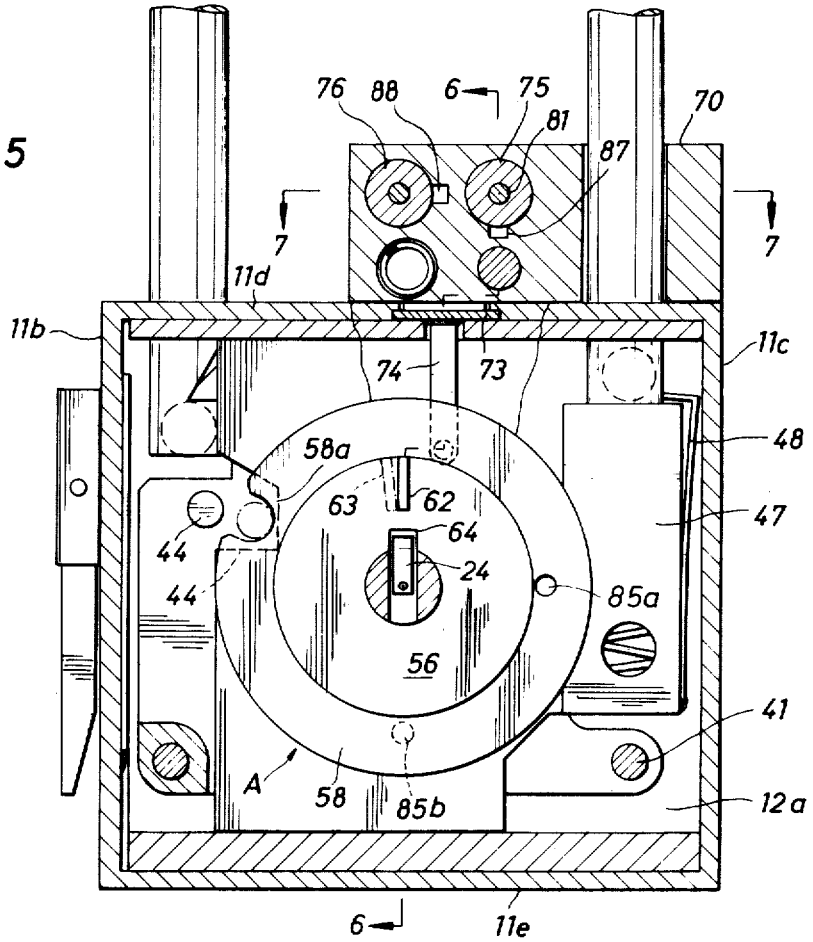
FIG. 5 is a sectional view taken along line 5—5 of FIG. 2.

Fence means are provided for moving the locking means out of locking engagement with the shackle to allow the shackle to move to the unlocked position. In the embodiment shown, the fence means includes member 35, previously described, upon which is mounted fence arm 44. This arm extends perpendicularly from member 35, and is positioned as shown in FIG. 5, to move into the gates on the periphery of the tumbler wheels to be described below. For our purposes now, however, it is sufficient to say that when the gates or recesses on the periphery of the tumbler wheels are positioned to receive fence member 44, member 35 can be rotated around pin 37 to the position shown in FIG. 4. As member 35 moves clockwise around pin 37, it will carry member 34 and move dog 30 out of slot 32 of shackle leg 10a, thereby releasing this shackle leg for upward movement to the position shown in FIG. 4. As member 35 rotates clockwise, arm 35a of the member engages arm 40a of member 40 and rotates this member counterclockwise around pin 41. This moves dog 31 out of engagement with slot 33 in shackle leg 10b, and thus both legs of the shackle can move upwardly to open the lock.

The shackle is urged upwardly by coil spring 46 when the dogs are moved out of engagement with the slots in the shackle legs. This spring is compressed between the bottom of sleeve 47, and the bottom of shackle leg 10b, when the shackle is in the locked position as shown in FIG. 3. Sleeve 47 is attached to rear wall 12a, as is shown in FIGS. 11 and 12, and serves to guide this leg of the shackle as it moves relative to the housing.

When the shackle moves to the unlocked position, means are provided to urge the shackle to rotate around the longitudinal axis of the retained leg, leg 10b, to move shorter free leg 10a so it hangs over the side of the housing for ease in hooking the shackle through a hasp with one hand. In the embodiment shown, such means comprises leaf spring 48 (FIGS. 10, 11, and 12), which has its lower end attached to sleeve 47 and its upper end bent over to engage shackle leg 10b. Where the spring engages the shackle leg, a flat 49 has been milled on the leg so that the corner of the milled flat will be engaged by the spring when the shackle is in the unlocked position as shown in FIG. 11. The force of spring 48 acting on the corner of the milled flat, will tend to cause the shackle to rotate to the position shown in FIG. 11 where the milled flat is in parallel with the edge of the spring that engages the shackle. To remove the shackle after the lock is open, it is necessary only to rotate the shackle further clockwise so that the milled flat portion on the shackle is moved out of engagement with the spring 48 and then the shackle can be pulled upwardly out of sleeve 47. When the shackle is removed and spring 46 is removed, then the housing screws are accessible through openings "H" provided in back wall 12a of the housing (FIG. 4). The screws are positioned so a screwdriver or an Allen wrench, or the like, can be inserted through the openings in the back wall to engage these housing screws and remove them so that the lock can be disassembled. When the shackle is in its locked position, it blocks access to the mounting screws, as shown in FIG. 3.

In accordance with this invention, means are provided to be rotated by the dial and for movement between a first position in driving engagement with the tumbler wheels of the lock for rotating the tumbler wheels to the desired position for the gates to receive the fence arm of the fence means and a second position out of driving engagement with the tumbler wheels and in driving engagement with the fence means to move the fence means into the gates and move the locking means out of locking engagement with the shackle. In the embodiment shown, such means includes shaft 22 and key 24. It is in its first position, as shown in FIG. 2. To move such means to its second position into driving engagement with the fence means, to actuate the fence means to move the locking means out of locking engagement with the shackle, dial 16 is moved inwardly along the longitudinal axis of shaft 22, compressing spring 21 and moving key 24 into position within the opening through fence hub 50, which is mounted on the slotted portion of the shaft. Rotation of the dial will then move the shaft and key 24 until the key engages one of four keyways 51 in hub 50, after which further rotation of the shaft by the dial will rotate hub 50 in a clockwise direction. This rotation is transmitted to member 35 to move the member to the position in FIG. 4 by link 52, which is connected to hub 50 by pin 53 and to member 35 by pin 54.

As explained above, before the fence means can be actuated to move the locking means out of locking engagement with the shackle, fence member 44 must move into gates provided on tumbler wheels. In the embodiment shown, two such tumbler wheels "A" and "B" are employed. The tumbler wheels have hubs 55 and 56, which are mounted for rotation on shaft 22, and rims 57 and 58, respectively. In accordance with one feature of this invention, means provide a frictional connection between the hubs and the rims of the tumbler wheels so that the hubs can be rotated while the rims are held stationary, but which will cause the rims to rotate with the hubs whenever the rims are free to do so. In the embodiment shown, hub 56 of tumbler wheel A has radially extending annular flanges 59 and 60 that are spaced apart to provide an annular groove to receive rim 58. For assembly purposes, the rim may be split and placed in the groove, after which the two split halves of the rim are welded together. The hub is made of resilient material, or material having spring-like quality, such as spring steel. Flanges 59 and 60 are bent inwardly far enough to take a permanent set when spaced apart less than the thickness of the rim so that, when the rim is placed between them, they will clamp the rim with sufficient force to cause the rim to rotate with the hub as long as it is free to rotate. When the rim is held against rotation, however, the connection will slip and allow hub 56 to be rotated relative to the rim. Tumbler wheel B is constructed in the same manner.

In the embodiment shown, tumbler A is the driving wheel and tumbler wheel B is the driven. Washer 61 is placed between the wheels to space them apart the desired distance. Rotation is imparted from tumbler wheel A to tumbler wheel B to driving lug 62 on hub 56 that engages lug 63 on hub 53 of wheel B. Tumbler wheel B is free to rotate on shaft 22, whereas tumbler wheel A, the driving wheel, is provided with keyway 64, as shown in FIG. 5, to receive key 24, when the key is in its first position, thus, rotation of dial 16 and shaft 22 will be imparted to tumbler wheel A through key 24. This rotation will be also transmitted to tumbler wheel B when lug 62 picks up lug 63 on wheel B. If the rotation of the shaft is reversed after the wheels are rotated together for a distance, then lug 62, of course, will rotate nearly 360° before it again picks up the driving lug on the other wheel. This is the well known lost motion connection between the tumbler wheels that is used in many combination locks of this type.

When the lock is assembled, bearing plates 66 and 67 are positioned on opposite sides of the two tumbler wheels. Preferably, the bearing plates are resilient and are mounted in the housing to exert a resilient force urging the tumbler wheels together against washer 61. In the embodiment shown, plate 66 is spaced from front wall 11a by spacer ring 66a. This spacer may be made of a compressible material, such as felt. Preferably, the diameter of the spacer is large enough to tend to bend the plate when the plate is subjected to a more centralized force through hub 55. Plate 67 is bent toward the wheels to provide a resilient force urging the wheels together by lugs 67a and 67b on the inside of housing plates 12b and 12c. This arrangement keeps the tumbler against washer 61 and the proper distance apart. Bearing plate 67 also isolates the tumbler wheels from the movements of the fence means and locking means located between this plate and the back wall of the housing.

With a two tumbler wheel lock, a combination of two numbers is dialed by rotating the dial first in one direction, then the other, in the well known manner, and this places the rims of the tumbler wheels in position so that the recesses or gates formed in the rims are in alignment and in position to receive fence member 44, as shown in FIG. 5. In this view, only gate 58a is shown, but gate 57a in the rim of tumbler wheel B can be seen in FIG. 2. Both of these gates must be in alignment to receive tumbler member 44 before the lock can be opened. After the tumbler wheels have been moved to the desired position in accordance with the combination of the lock, dial 16 is moved inwardly against spring 21 and key 24 is moved out of driving engagement with tumbler wheel A and into position to engage and rotate fence hub 50 as described above. The operator of the lock does not know that he has positioned the tumbler wheels in the proper position until he has moved key 24 out of driving engagement with the wheels and into driving engagement with the hub. If it is not the right combination, the lock will not open and he has to then return the key to its first position in driving engagement with the tumbler wheels to try again. In no way can he hold fence member 44 in engagement with the periphery of the rims of the tumbler wheels, while he rotates the tumbler wheels. This very effectively prevents the picklock from determining the combination by sound or feel.

Means are provided to change the combination when desired. As shown in FIG. 1, the combination changing lever 65 is mounted on sidewall 11b of the housing between mounting lugs 66 and 67. Pin 68 extends through the mounting lugs and lever, and supports the lever for pivotal movement around the axis of the pin. Spring strip 69 is attached at one end to the inside of housing wall 11b. Strip 69 is positioned so that when lever arm 65 is pivoted to the dotted line position shown in FIG. 4, the upper end of the lever will bend strip 69 into engagement with member 35 and hold the member in the position shown. At this time, fence member 44 is in engagement with the gates on the periphery of the tumbler wheels. Thus, rotation of the dial will rotate the hubs of the tumbler wheels while the fence member holds the rims against rotation. This allows the combination to be changed to two other numbers, by changing the relative position of the gates on the periphery of the wheels by changing the position of the hubs relative to the rims and the gates therein. Note that this can only be done when the shackle is in its unlocked position, otherwise leg 10a of the shackle would keep the spring strip from moving far enough to force the fence member against the tumbler wheels. This is a necessary feature to keep picklocks from being able to feel out the combination.

Means are also provided in this invention to allow the lock to be opened when the owner thereof forgets the combination that he has been using. Further in accordance with this invention, such means include means to position the rims on the tumbler wheels in a preselected position after which a known master combination can be used to open the lock. It is an additional feature of this invention to provide such means with a separate combination lock, the tumblers of which must be placed in the proper position before the lost combination means can be actuated. The combination to this second combination lock is included with the master combination, but by providing an additional lock, a picklock is further discouraged in his attempt to open the lock.

Figure 6:
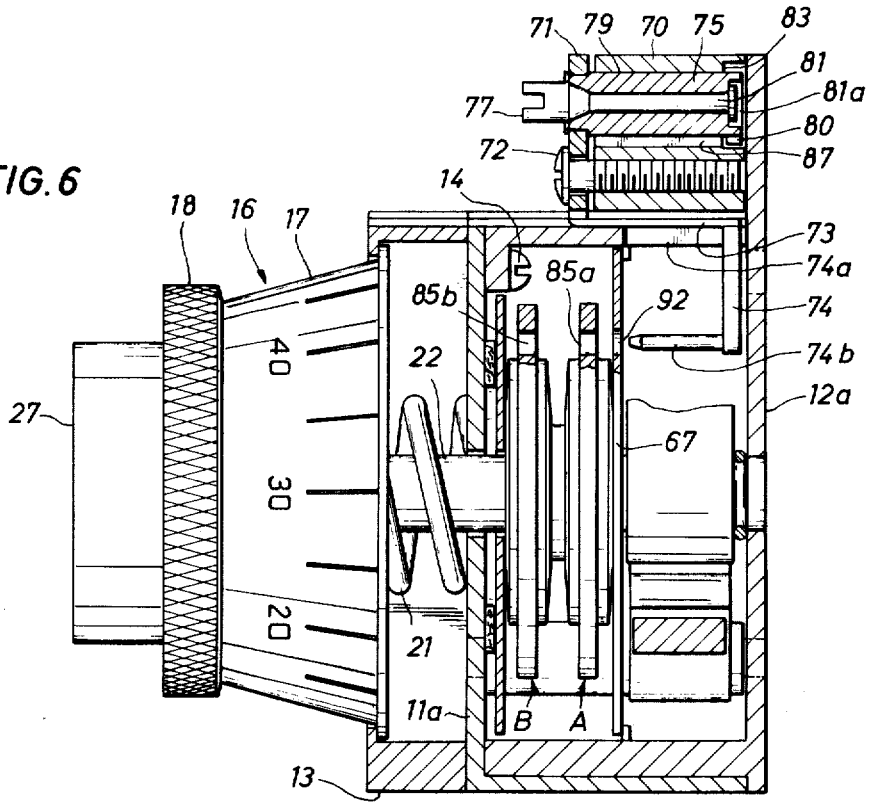
FIG. 6 is a sectional view taken along line 6—6 of FIG. 5.

In the embodiment shown in FIGS. 1 through 12, the lost combination means includes generally rectangular body 70, that is attached to back wall 12a of the housing. The back wall extends upwardly above the housing of the lock and supports body 70 in the position shown in FIGS. 1, 5, and 6. Attached to the front of body 70 is front plate 71. This plate is attached to the body by machine screw 72 that extends through the plate and engages a tapped hole in the body. A dovetail type groove is formed in the upper side of the housing, as shown in FIGS. 1, 5, and 6. Plate 73 is located in the groove and is attached to front plate 71, which extends into the dovetail groove also, so that the front plate and plate 73 will move together as the front plate moves toward and away from body 70. Arm 74 extends downwardly from plate 73 into the housing through slot 74a in mounting plate 12b that is covered by body 70. Pin 74b extends perpendicularly from arm 74 and perpendicular to the plane of tumbler wheels A and B, as shown in FIG. 6.

Combination lock means are provided that must be set to a preselected combination before the lost combination apparatus can be actuated. It is contemplated by the inventors that the purchaser of the lock will be provided with a master combination number, the first two numbers of which will be the position to which this combination lock arrangement must be set in order to open the lock with the master combination.

This auxiliary combination lock includes two tumbler cylinders 75 and 76, and two drive shafts 77 and 78, respectively. The construction and arrangement of each tumbler and its drive shaft is the same so only one will be described in detail. In FIG. 7, tumbler cylinder 75 is shown in section. It is located in hole 79 that extends through body 70. Adjacent backplate 12a, the hole is of larger diameter to accommodate lug 80 attached to the cylinder. The front portion of the cylinder is of reduced diameter and extends through an opening in front plate 71. The outer end of the cylinder is peened or upset to lock the cylinder to the front plate between the peened portion and shoulder 75a. Central opening 81 extends through the cylinder in which is located drive shaft 77. The central opening is tapered adjacent its forward end to mate with conical surface 77a on the shaft to provide a friction drive between the shaft and the cylinder. Opening 81 has portion 81a of enlarged diameter. Shaft 77 extends into portion 81a and is upset sufficiently as shown to hold the shaft from moving out of the opening. A screwdriver slot is provided in the end of the shaft that extends out of the cylinder for convenience in rotating the shaft.

Coil spring 86a is located in hole 86 in block 70, as shown in FIG. 9, and urges the front plate away from the block. Lug 80 on tumbler cylinder and lug 82 on cylinder 76 will engage shoulders 83 and 84, respectively, and hold the cylinders and front plate 71 from moving away from block 70, after holding screw 72 is removed, unless the cylinders have been positioned with the lugs in alignment with key slots 87 and 88 that extend along the openings in which the cylinders are located. As shown in FIG. 3, the block is inscribed with a number of equally spaced marks 90 around tumbler cylinders 75 and 76. An indexing mark 91 is made on each cylinder. The first two numbers of the master combination will be the positions for the tumbler cylinders that will align the lugs thereon with the keyslots. When so positioned, holding screw 72 can be removed and the front plate will be moved away from block 70 and pin 74b will be moved through opening 92 into engagement with rim 58 of tumbler wheel A. The tumbler wheel is provided with opening 85a to receive pin 74b when the tumbler wheel has been rotated to the proper position. Thus, pin 74b will ride on rim 58 until opening 85a is moved into alignment with it, then the pin will move through opening 85a and into engagement with the rim of tumbler wheel B. At this time, of course, it will hold rim 58 of the first tumbler wheel against further rotation. Continued rotation of tumbler wheel B will cause hub 56 of tumbler wheel A to rotate relative to rim 58. When opening 85b of tumbler wheel B is brought into alignment with pin 74b, then both rims will be held against further rotation by pin 74b. When this occurs, then the rims of the tumbler wheels will be in a known preselected position. Pin 74b is then retracted by forcing front plate 71 back into engagement with block 70 against the force of coil spring 86a, and returning holding screw 72 to its position to hold the plate against the body. The master combination will indicate the number of spaces or increments to move dial 16 in a first given direction, and then in a second given direction to bring the gates into alignment to receive fence member 44 so the lock can be opened. Once opened, of course, the combination can be changed to any desired combination and the lock returned to service.

The design of the tumbler cylinders described above provides a friction drive between the shaft and the cylinders. This is to increase the difficulty a picklock would have when attempting to use the lost combination apparatus to pick the lock. When holding screw 72 is made up to hold the front plate against block 70, lugs 80 and 82 are spaced from shoulders 83 and 84. The cylinders in this position can be easily rotated through the friction produced between the conical section of the shaft and the tapered opening in the cylinder; but with the lugs spaced from the shoulders, the picklock can feel nothing to indicate where to position the cylinders. To prevent the picklock from loosening screw 72 until the lugs engage the shoulders and then feeling out the combination, shoulders 83 and 84 are roughened or knurled, or preferably provided with a plurality of radial slots that are in alignment with the marks inscribed on the front. Coil spring 86a should urge front plate 71 away from the block with sufficient force to provide enough friction between lugs 80 and 82 and shoulders 83 and 84, respectively, to keep the cylinders from turning with the shafts. If the picklock attempts to increase the frictional force between the tapered portions of the shafts and the cylinders, front plate 71 and the cylinders will move back toward the block and move the lugs away from the shoulders. The cylinders will now turn with the shaft but, as explained above, the picklock can feel nothing to indicate where he should position the cylinders.

Alternate arrangements for opening the lock when the combination is lost is shown in FIGS. 13 through 16. In each of these embodiments, the apparatus for providing a combination lock that must be opened as the initial step in this operation is the same, so this will not be discussed further. In the FIG. 13 embodiment, instead of using pin 74b as shown in FIG. 6, bar member 90 is attached to front plate 71 and located inside the lock housing. Depending from the bar member are two leaf springs 91 and 92. These springs are positioned so that when bar 90 is moved forward they will move plugs 93 and 94, respectively, into engagement with the rims of the tumbler wheels. The wheels are provided with openings to receive the lugs which stops the rotation of the rims in the same manner as described in connection with the pin 74b of FIG. 6.

In the embodiment shown in FIG. 14, after front plate 71 has been moved away from the body 70, a probe of some type, such as bar 95, can be inserted through opening 96 in the upper wall of the housing, to force apart spring members 97 and 98, and urge lugs 97a and 98a into engagement with the periphery of the tumbler wheels to stop the wheels from rotating in the manner described above in connection with the embodiment of FIG. 6.

In FIGS. 15 and 16, front plate 71 is shown in position to close opening 96. In this embodiment, however, when opening 96 is exposed, bar 95 can be extended through the opening between the tumbler wheels to engage leaf spring 101 and force plate 104 attached to the spring into the space between the tumbler wheels. Rotation of the wheels will cause lugs 99 and 100 to engage plate 104. This stops the rims from further rotation. Here again, the purpose is to stop the rims in a predetermined position depending upon the location of stop lugs 99 and 100. From this point on, a known combination can be used to open the lock. Spring 101 will hold plate 104 above the lugs, normally.

From the foregoing, it will be seen that this invention is one well adapted to attain all of the ends and objects hereinabove set forth, together with other advantages which are obvious and which are inherent to the method and structure.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, what is claimed is:

1. A combination lock comprising a shackle movable between a locked and an unlocked position;

locking means movable into and out of locking engagement with the shackle;

fence means for moving the locking means out of locking engagement with the shackle;

a plurality of tumbler wheels having peripheral gates to receive the fence means and permit the fence means to move the locking means out of locking engagement with the shackle;

a rotatable dial; and means rotated by the dial and movable axially between a first position in driving engagement with the tumbler wheels for rotating the tumbler wheels to the desired position for the gates therein to receive the fence means, and a second position out of driving engagement with the tumbler wheels and in driving engagement with the fence means to move the fence means into the gates and move the locking means out of locking engagement with the shackle.

2. The lock of claim 1, further provided with means resiliently urging the tumbler wheel and fence driving means to the first position.

3. The lock of claim 1 in which each tumbler wheel comprises a hub, an outer rim mounted on the hub, and means for providing a frictional connection between the hub and rim that will slip when the rim is held against rotation and the hub is rotated.

4. The lock of claim 3, further provided with means to hold the fence means in engagement with the gates of the tumbler wheels to hold the rims stationary while the hub of the wheels are rotated to change the combination required to position the gates to receive the fence means.

5. The lock of claim 3, further provided with means for opening the lock when the combination is forgotten, including means for stopping the rotation of each of the rims of the tumbler wheels in a predetermined position to allow the tumbler wheels to be rotated from the predetermined position in accordance with a known master combination, to a position for their gates to receive the fence means and open the lock.

6. The lock of claim 5, further provided with second combination lock means for preventing the actuation of the lost combination rim positioning means.

7. The lock of claim 6 in which the second combination lock means includes a tumbler cylinder positioned for rotation on its longitudinal axis in an opening in a fixed body, said opening having an intersecting, parallel slot along one side, a lug attached to the cylinder that holds the cylinder from movement axially out of the opening except when the lug is in position to move through the slot, and means connecting the tumbler cylinder to the means for stopping the rims in a predetermined position to hold said means out of the rim stopping position until the lug is positioned to allow the cylinder to move axially of the opening.

8. The lock of claim 7 in which the second combination lock means includes a second tumbler cylinder located in a second hole in said body having a parallel, intersecting slot, and a lug on the second cylinder to hold the cylinder from moving axially except when aligned with said slot, and means connecting the second tumbler cylinder to the means for stopping the rims in a predetermined position to hold said means out of rim stopping position until the lugs on both the first and second cylinders are positioned to allow the cylinders to move axially of the openings in which they are located.

9. The lock of claim 1, further provided with a housing having one side that can be disconnected from the remainder of the housing to expose the portions of the lock inside the housing, means releasably holding said side to the housing, said means being located inside the housing and accessible through opening means in the housing, said holding means and opening means being positioned so the shackle is located between the opening means and the holding means when in its locked position and can be moved out of position between the holding means and the opening means only when the shackle is unlocked.

10. The lock of claim 1, further provided with a housing and in which the shackle is U-shaped having one leg that moves out of the housing when the shackle moves to its unlocked position, and in which said lock is further provided with means to resiliently urge the shackle to rotate around the longitudinal axis of the second leg a predetermined amount when the shackle moves to its unlocked position.

11. A combination lock comprising a shackle movable between a locked and an unlocked position;

locking means movable into and out of locking engagement with the shackle;

fence means for moving the locking means out of locking engagement with the shackle;

a plurality of tumbler wheels having peripheral gates to receive the fence means and permit the fence means to move the locking means out of locking engagement with the shackle; and a shaft supporting the tumbler wheels for rotation, means supported by the shaft for rotating therewith to cause the fence means to move the locking means out of locking engagement with the shackle, dial means for rotating the shaft, and means movable between a first position providing a driving connection between the shaft and one of the tumbler wheels for rotation of the wheel with the shaft, and a second position providing a driving connection between the shaft and the fence actuating means for rotation of the fence actuating means with the shaft.

12. The lock of claim 11 in which the dial is movable axially of the shaft and means are provided connecting the dial to the movable means providing a driving connection alternatively between the shaft and the fence actuating means so that movement of the dial axially of the shaft moves the driving connection means between its first and second positions.

13. The lock of claim 12 in which one of said tumbler wheels and said fence actuating means have keyslots, and in which shaft has a keyway therein and said driving connection means comprises a key located in the shaft and movable axially of the shaft and the means connecting the key to the dial includes spring means for urging the key out of the slot into driving engagement with keyslots provided in said tumbler wheel and said fence actuating means.

14. The lock of claim 11 in which each tumbler wheel comprises a hub, an outer rim mounted on the hub, and means for providing a frictional connection between the hub and rim that will slip when the rim is held against rotation and the hub is rotated.

15. The lock of claim 14, further provided with means to hold the fence means in engagement with the gates of the tumbler wheels to hold the rims stationary while the hub of the wheels are rotated to change the combination required to position the gates to receive the fence means.

16. The lock of claim 14, further provided with means for opening the lock when the combination is forgotten, including means for stopping the rotation of each of the rims of the tumbler wheels in a predetermined position to allow the tumbler wheels to be rotated from the predetermined position in accordance with a known master combination, to a position for their gates to receive the fence means and open the lock.

17. The lock of claim 16, further provided with second combination lock means for preventing the actuation of the lost combination rim positioning means.

18. The lock of claim 17 in which the second combination lock means includes a tumbler cylinder positioned for rotation on its longitudinal axis in an opening in a fixed body, said opening having an intersecting, parallel slot along one side, a lug attached to the cylinder that holds the cylinder from movement axially out of the opening except when the lug is in position to move through the slot, and means connecting the tumbler cylinder to the means for stopping the rims in a predetermined position to hold said means out of the rim stopping position until the lug is positioned to allow the cylinder to move axially of the opening.

19. The lock of claim 18 in which the second combination lock means includes a second tumbler cylinder located in a second hold in said body having a parallel, intersecting slot, and a lug on the second cylinder to hold the cylinder from moving axially except when aligned with said slot, and means connecting the second tumbler cylinder to the means for stopping the rims in a predetermined position to hold said means out of rim stopping position until the lugs on both the first and second cylinders are positioned to allow the cylinders to move axially of the openings in which they are located.

*20. A combination lock comprising a bolt movable between a locked position and an unlocked position, means for holding the bolt in its locked position, means for releasing the holding means to allow the bolt to be moved to its unlocked position including a plurality of tumblers mounted for rotation, dial means for rotating the tumblers to a preselected position in accordance with a selected combination to allow the holding means to be released, and means for opening the lock when the selected combination is forgotten including means movable into engagement with each tumbler as the tumbler is rotated by the dial means to indicate when the tumbler reaches a preselected position from which position each tumbler can be rotated by the dial means to another position in accordance with a master combination to open the lock.*

*21. The lock of claim 20 further provided with means to change the selected combination including dial means for indicating the position to which each tumbler is positioned and means for changing the relative position of the dial means and the position of the tumblers when in position to allow the holding means to be released to change the combination for opening the lock.*

*22. The lock of claim 20 in which each tumbler comprises a hub and an outer rim mounted on the hub to grip the hub with sufficient force to provide a frictional connection between the two that will cause the rim and hub to rotate together when both are free to rotate and will slip when one is held against rotation and the other is rotated.*

*23. The lock of claim 20 in which each tumbler has an opening and the means movable into engagement with each tumbler includes a member for moving into the opening to stop the rotation of the tumbler in said preselected position when the tumbler has been rotated to locate the opening in position to receive the member.*

* * * * *